Patented Aug. 19, 1941

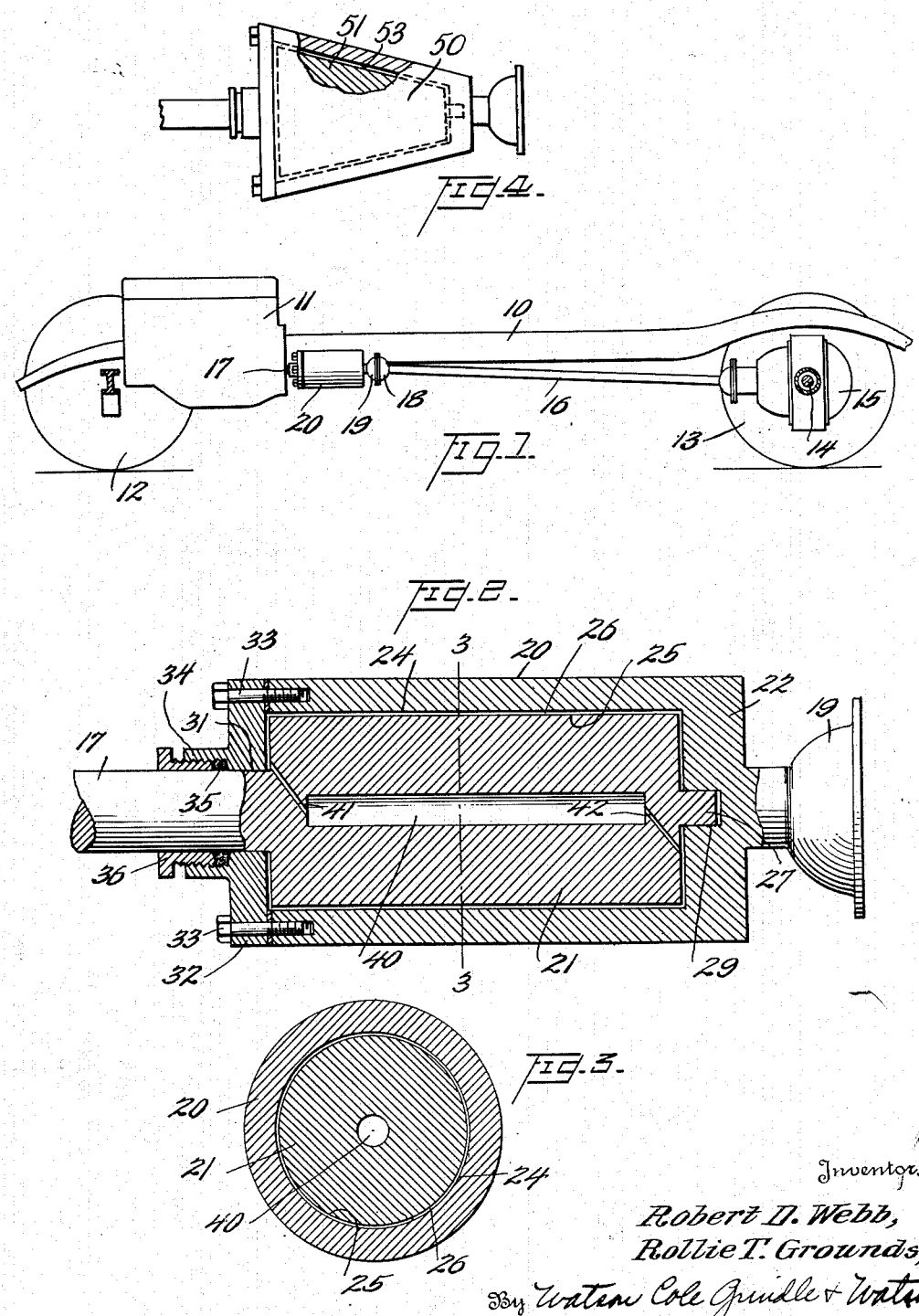

2,253,001

UNITED STATES PATENT OFFICE 2,253,001

POWER TRANSMITTING DEVICE

Robert Dickens Webb and Rollie Tomlinson Grounds, Minden, La.; said Grounds assignor to said Webb Application January 25, 1939, Serial No. 252,816

6 Claims. (Cl. 192—58)

This invention relates to power transmitting means primarily intended as a substitute for the usual clutch and transmission or gear box of automotive vehicles, but not restricted to such use, being applicable to a great number of purposes where power is to be transmitted from a driving to a driven member in a gradual application.

It is a general object of the present invention to provide a novel and improved power transmitting means or clutch device.

More particularly it is an object of the invention to provide a power transmitting means in which the driving and driven parts are fixed in adjustment and are always out of direct contact with each other.

A further object of the invention consists in the provision of a clutch substitute having fixed space relationship of driving and driven parts and in which the driving torque increases with an increase in the difference between the relative speeds of these parts.

An important feature of the invention consists in the arrangement of a power transmitting device in the drive line between the motor and the driven axle of an automotive vehicle, which device forms the sole connecting and speed regulating mechanism in this drive line and is completely without adjustments or manual operating means.

Another important feature of the invention consists in the arrangement of coaxial, telescoped cylindrical driving and driven elements having interposed in the clearance between them a fluid or semi-fluid serving as the sole connecting power transmitting means from one to the other.

Another feature of the invention consists in the use of a fluid as the connecting means between the driving and driven parts of the power transmitting means which fluid also serves as a lubricant for the bearing surfaces between these parts to permit of their relative rotation.

A still further feature of the invention consists in the provision of an automotive vehicle entirely devoid of clutch control and speed change gears, in which the connection between the engine and the driving axle is effected solely by the control of the engine speed without, however, providing any mechanism for automatic clutch adjusting or control.

Other and further features and objects of the invention will be more apparent to those skilled in the art upon a consideration of the accompanying drawing and following specification wherein is disclosed a single exemplary embodiment of the invention shown as applied to a conventional automotive vehicle with the understanding, however, that similar embodiments of the invention may be applied to other types of machinery and that such changes and variations may be made in the elements thereof as fall within the scope of the appended claims without departing from the spirit of the present invention.

In said drawing:

Figure 1 is a longitudinal vertical central section through the chassis of a motor vehicle equipped with power transmitting means according to the present invention;

Figure 2 is a central longitudinal section through such power transmitting means;

Figure 3 is a transverse section on line 3—3 of Figure 2; and

Figure 4 is a schematic elevation partly in section showing a modified form of the invention.

The conventionally accepted forms of clutches which are capable of connecting a load to a source of power by a gradual application have been universally of the manually operable friction type equipped with some means for slowly engaging two or more friction surfaces so that the load is picked up gradually. Such forms of clutches suffer from a number of well known defects. They require adjustment to take care of the normal wearing of the friction surfaces which must at times be replaced; they are subject to heating where used often or for hard service; they require a more or less complex arrangement for separating the friction parts; they require strong springs for bringing the friction parts together; they demand a careful control of their application to prevent grabbing; they require lubrication of the thrust elements used in the separation of the parts and in general the diameters are large where considerable power is to be transmitted. Such clutches when fully engaged provide 100% speed transfer between the driven and driving elements. They are not capable of any shock absorbing between the driven and drive elements when fully engaged nor are they adaptable for bringing heavy loads up to speed. Where applied for use in automotive vehicles they are not capable of directly connecting the engine to the rear wheels when the vehicle is at a standstill, so a complex and costly gear box must be interposed between the clutch and the rear wheels in order that the vehicle can be accelerated through several interposed gears reducing the torque on the clutch and the amount of slippage required thereof.

Another form of vehicle drive makes use of a hydraulic transmission in which a pump is driven by the engine and circulates a fluid to and from a turbine or hydraulic motor connected to the driving wheels. This arrangement involves a continual displacement of the driving fluid and provision must be made for cooling the same. The mechanism is complex, cumbersome, subject to leakage and in most cases requires some manual operation to obtain changes in speed or driving torque.

In accordance with the present invention a simple power transmission device is interposed in the drive line as the sole means between the engine and the driven wheels (excluding the driven axle fixed reduction gear) for connecting the engine to said wheels, for providing the necessary regulated transmission of power and to accelerate the vehicle from a standing start without stalling or overloading the internal combustion engine which has but little power at low speeds. This mechanism has no manual controls and applies the torque of the engine to the driven wheels in increasing proportions as the engine speed increases in relation to the wheel speed. It is capable of transmitting the full power of the engine with very little slippage at high speeds of the vehicle while still being capable of absorbing shocks resulting from rough roads, irregular engine operation, etc.

In the above discussion the power transmission device of the present invention has been particularly referred to for use in combination with an automotive vehicle, but it will be understood that it is equally applicable to other uses where clutches and/or gear transmissions are desirable, and it is not intended that the invention shall be restricted to a device for use for automotive purposes.

Referring now to the drawing, there is shown at 10 the chassis of a conventional motor vehicle supporting the motor 11 and itself supported from the front wheels 12, and the rear wheels 13 which are mounted on the usual axle shafts 14 connected together and driven through the differential and speed reduction gears in the housing 15. The drive shaft 16 is arranged to drive the rear axle and the motor shaft 17 is connected to the drive shaft through one or more suitable universal joints 18. The power transmitting device of the present invention is interposed anywhere desirable within the drive line. It is shown as between the engine and the forward universal joint 18 so that the engine shaft 17 is connected to the driving part thereof and the universal joint half 19, shown in Figure 2, is connected to the driven part thereof.

The device itself comprises two main parts, a housing or outer hollow member 20 and an inner core 21 concentric therewith and telescoped therein. The end 22 of the housing or outer member is preferably integral therewith and may be directly attached to the universal joint part whereas the core is shown as integral with the shaft 17 but obviously it can be separate and suitably attached thereto.

The inner surface 24 of the casing is shown in Figure 2 as truly cylindrical, although it might be conical as shown in Figure 4 or otherwise shaped as a figure of revolution, without departing from the spirit of the invention. The outer surface 25 of the core is correspondingly shaped and there is a slight fixed clearance 26 between the two surfaces, to insure against mechanical contact between the two. The core may be provided on its unattached end with a stud 27 journalled in the recess 29 at the corresponding end of the housing. The shaft 17 is supported in a bore 31 in the cap 32 secured by studs 33 on the open end of the housing. This cap also carries a stuffing box 34 in which is fitted packing 35 tightened by a gland 36 to prevent leakage. It is evident that other means can be employed here to prevent leakage.

In the center of the core is provided a longitudinal recess or chamber 40 which may have its ends connected respectively by passages 41 and 42 to clearance spaces 26. In this case chamber 40 as well as the clearance space 26 are substantially completely filled with a suitable fluid or semi-fluid which in addition to acting to transmit power may be used to lubricate the bearings.

The clearance between the confronting surfaces 24 and 25 of the power transmitting means is not extremely critical but to some extent is controlled by the viscosity and adhesiveness of the interposed fluid. In several full sized experimental models a clearance of $\frac{1}{32}$ of an inch on each side has been found very satisfactory and for all practical purposes the power transmission is as good as where a clearance of not more than .01 inch is used. Obviously, the devices with larger clearances are simpler to construct and are less liable to damage in the event of foreign matter entering the fluid. It is believed that clearances varying from .001 of an inch to approximately ¼ of an inch will be entirely satisfactory.

It is preferred to have the opposing surfaces smoothly finished and concentric. Cylindrical surfaces are preferred but not essential. It is considered that the use of peripheral or longitudinal grooves does not contribute materially to the amount of power which can be transmitted but only serves to unduly heat the interposed fluid. This fluid may be any of the various grades of lubricating oil, glycerine, water, one of the alcohols, etc. It is preferred that the fluid have but little change in viscosity throughout a wide temperature range.

In operation the rotation of the driving member, in this case the core, causes the interposed fluid to exert, by reason of its molecular friction, a driving force or torque upon the other member gradually bringing it up to substantially the speed of the driven member with a torque which varies with the difference in velocity of the two parts. Obviously this torque can be changed by a choice of the viscosity of the interposed liquid and by the sizes of the parts of the device.

With a power transmitting device of the type described applied to a motor vehicle the torque transmitted, with the engine idling, is so slight that the vehicle will remain stationary. In order to start it up it is merely necessary to accelerate the engine so that the torque transfer is gradually increased. The slippage between the fluid connected parts is reduced as the drive shaft 16 is accelerated to substantially the speed of the engine, bringing the vehicle from a standstill to its desired speed as determined by the engine speed in a gradual, smooth acceleration wherein there is no possibility of jerking or bucking. The ordinary driver is thus capable of as smooth a start as the most expert for there is nothing to be controlled by the driver except the accelerator of the engine. To stop the vehicle it is only necessary to reduce the engine speed by removing the foot from the accelerator. The reverse of the above operation now takes place when the engine is driven by the wheels and acts as a brake to reduce the vehicle speed. In this operation it is impossible to not use the retarding effort of the engine in coming to a stop, a valuable feature not always made use of by the average driver in the conventional form of vehicle. Final stopping of the vehicle is accomplished by the use of the regular brakes in the ordinary manner.

Because of the nature of the coupling between the driving and driven parts of the present device it is capable of "shock absorbing" to a great extent. For instance, it will slip on the application of sudden overloads and will immediately resume the drive on their release. When used on automotive vehicles it is practically noiseless and capable of producing a smooth ride even if one or two cylinders of the engine are "missing." Obviously it likewise reduces the shock of the axles and driving gears as well as the universal joints. Because of the ability of the device to gradually pick up its load there is no need of a gear box or transmission and it is found that vehicles can be started on upgrades and in difficult places with more facility than in conventional cars.

The simplification of the driving means for the vehicle is at once apparent. The brake pedal can be moved to the left for use by the left foot and the accelerator may take its original place. No other controls are required and one foot is allotted to each pedal so that the control is speedier and more positive and the front compartment of the vehicle is cleared of the gear shift lever. Three people can thus be accommodated on the front seat without interfering with the driver.

The power transmitting device is capable of a great many embodiments. It can be made of any desired diameter and the amount of power capable of being transmitted can be increased by increasing its length. It is not essential that the cooperating parts be cylindrical but merely that cooperating surfaces be coaxial and have clearance.

Figure 4 illustrates schematically an embodiment of the invention in which the telescoping members are conical in form, the outer cone or shell 50 being constructed in every respect like the cylindrical shell 20 in Figure 2 except for the tapering longitudinal section. Likewise the inner member 51 may be constructed similar to the core 21 of Figure 2 and the clearance space 53 will be of uniform width throughout the confronting surfaces. Obviously other figures of revolution may be substituted for the cylinder and cone illustrated without departing from the spirit of the invention.

The power transmitting device just described provides for greater safety on the road because of the ease of operation of a vehicle equipped therewith. In addition it produces cars of greater durability with less likelihood of getting out of order. Repairs to conventional clutches and gear transmissions are costly and time-consuming whereas this device greatly reduces these.

Having thus described the invention, what is claimed as new and desired to be secured by Letters Patent is:

1. In a motor vehicle, in combination, a frame, driven wheels, axle and differential drive means therefor, an engine, drive means between said engine and differential drive, a power transmitting device interposed in said drive means and comprising two coaxial, telescoped parts having continuous uniform surfaces, one part directly connected to the engine and the other directly connected to the said differential drive, means supporting said parts in such relation to each other and such parts being of such relative size that there is provided a uniform fixed clearance between the whole of said surfaces, and a fluid providing the sole driving connection between said parts.

2. A power transmitting device for automotive vehicles adapted to replace the clutch and gearbox thereof and comprising in combination, a housing part having a central chamber shaped as a figure of revolution and having closed ends, one adapted for connection to a driving or driven element, a core part of similar configuration in said chamber and having a portion extending out through opening in the other end thereof for connection to a driven or driving element, bearings to maintain the alignment of said parts, said parts having smooth surfaces spaced by a uniform fixed clearance, and a fluid filling said clearance space and forming the sole connecting means between said parts.

3. A power transmitting device for automotive vehicles adapted to replace the clutch and gearbox thereof and comprising in combination, a housing part having a central chamber shaped as a figure of revolution and having closed ends, one adapted for connection to a driving or driven element, a core part of similar configuration in said chamber and having a portion extending out through opening in the other end thereof for connection to a driven or driving element, bearings interposed between said parts to maintain their alignment, said parts having smooth surfaces spaced by a fixed clearance, a viscous lubricant filling said clearance space and forming the sole connecting means between said parts and means to conduct said lubricant from said clearance space to said bearings.

4. A power transmitting device for automotive vehicles adapted to replace the clutch and gearbox thereof and comprising in combination, a housing part having a central chamber shaped as a figure of revolution and having closed ends, one adapted for connection to a driving or driven element, a core part of similar configuration in said chamber and having a portion extending out through opening in the other end thereof for connection to a driven or driving element, bearings interposed between said parts to maintain their alignment, said parts being spaced by a fixed clearance, a central chamber in said core, a bore from said chamber to said clearance space and a fluid filling said chamber and clearance space to form the sole power transmitting means from one part to the other.

5. In a motor vehicle, the combination with the engine, driven wheels and connecting drive means, of a power transmitting device interposed in said drive means and forming the sole connecting and disconnecting means between the engine and wheels, permitting the engine to idle with the load stationary and adapted to gradually bring the load to substantially engine speed as the engine speed is increased, said device comprising a driving and a driven concentric part, one wholly within the other and each having continuous, confronting, smooth surfaces of revolution permanently and uniformly spaced to provide a fixed uniform clearance throughout and constant confronting areas, and a liquid completely filling the clearance space at all times.

6. In a motor vehicle, the combination with the engine, driven wheels and connecting drive means, of a power transmitting device interposed in said drive means and forming the sole connecting and disconnecting means between the engine and wheels, permitting the engine to idle with the load stationary and adapted to gradually bring the load to substantially engine speed as the engine speed is increased, said device comprising a driving and a driven concentric part, one wholly within the other and each having continuous, confronting, smooth surfaces of revolution permanently and uniformly spaced to provide a fixed uniform clearance throughout and constant confronting areas, a fluid between said surfaces forming the sole driving connection, a reservoir for additional fluid disposed in the inner one of said parts, and located radially inward of said confronting areas, and a duct connecting said reservoir and clearance space.

ROBERT DICKENS WEBB.
ROLLIE TOMLINSON GROUNDS.